(12) United States Patent
Ryu

(10) Patent No.: US 8,716,371 B2
(45) Date of Patent: May 6, 2014

(54) REED COMPOSITE, MANUFACTURING METHOD THEREOF AND BUILDING MATERIAL USING THE SAME

(76) Inventor: Hee Lyong Ryu, Hwaseong-si (KR)

(*) Notice: Subject to any disclaimer, the term of this patent is extended or adjusted under 35 U.S.C. 154(b) by 0 days.

(21) Appl. No.: 13/503,200

(22) PCT Filed: Oct. 7, 2010

(86) PCT No.: PCT/KR2010/006844
§ 371 (c)(1),
(2), (4) Date: Apr. 20, 2012

(87) PCT Pub. No.: WO2011/049305
PCT Pub. Date: Apr. 28, 2011

(65) Prior Publication Data
US 2012/0214910 A1 Aug. 23, 2012

(30) Foreign Application Priority Data
Oct. 21, 2009 (KR) .................. 10-2009-0100037

(51) Int. Cl.
*C08L 97/02* (2006.01)
(52) U.S. Cl.
USPC ............................................................. 524/9
(58) Field of Classification Search
None
See application file for complete search history.

(56) References Cited

FOREIGN PATENT DOCUMENTS

| CN | 1847319 A | * 10/2006 |
|----|-----------|-----------|
| KR | 10-1987-0004206 A | 5/1987 |
| KR | 1 0-01 86715 B1 | 12/1998 |
| KR | 10-2002-0062867 A | 7/2002 |
| KR | 10-0643338 B1 | 11/2006 |
| KR | 10-0760690 B1 | 9/2007 |
| RO | 121126 B1 | * 12/2006 |

OTHER PUBLICATIONS

Machine Translation of CN 1847319A.*
Machine Translation of RO 121126B1.*
The Ohio State University. Ohio Perennial & Biennial Weed Guide: Common Reed. http://www.oardc.ohio-state.edu/weedguide/singlerecord.asp?id=110. Accessed Apr. 8, 2013.*
Particle Size—US Sieve Series and Tyler Mesh Size Equivalents. AGM Container Controls, Inc. As seen at http://www.agmcontainer.com/desiccantcity/pdfs/Mesh_Size_Equivalents.pdf on Aug. 15, 2013.*

* cited by examiner

Primary Examiner — Robert C Boyle
Assistant Examiner — Stephen Rieth
(74) Attorney, Agent, or Firm — Sughrue Mion, PLLC

(57) ABSTRACT

The present invention relates to reed composite which can be used as building material, method for manufacturing the composite, and building material using the composite. The reed composite contains reed stalk having a particle size of 40 to 180 mesh 25 to 45 wt % of thermoplastic polymer impregnated into fibers of the reed stalk. The reed composite is eco-friendly and has improved strength and no swelling.

15 Claims, 1 Drawing Sheet

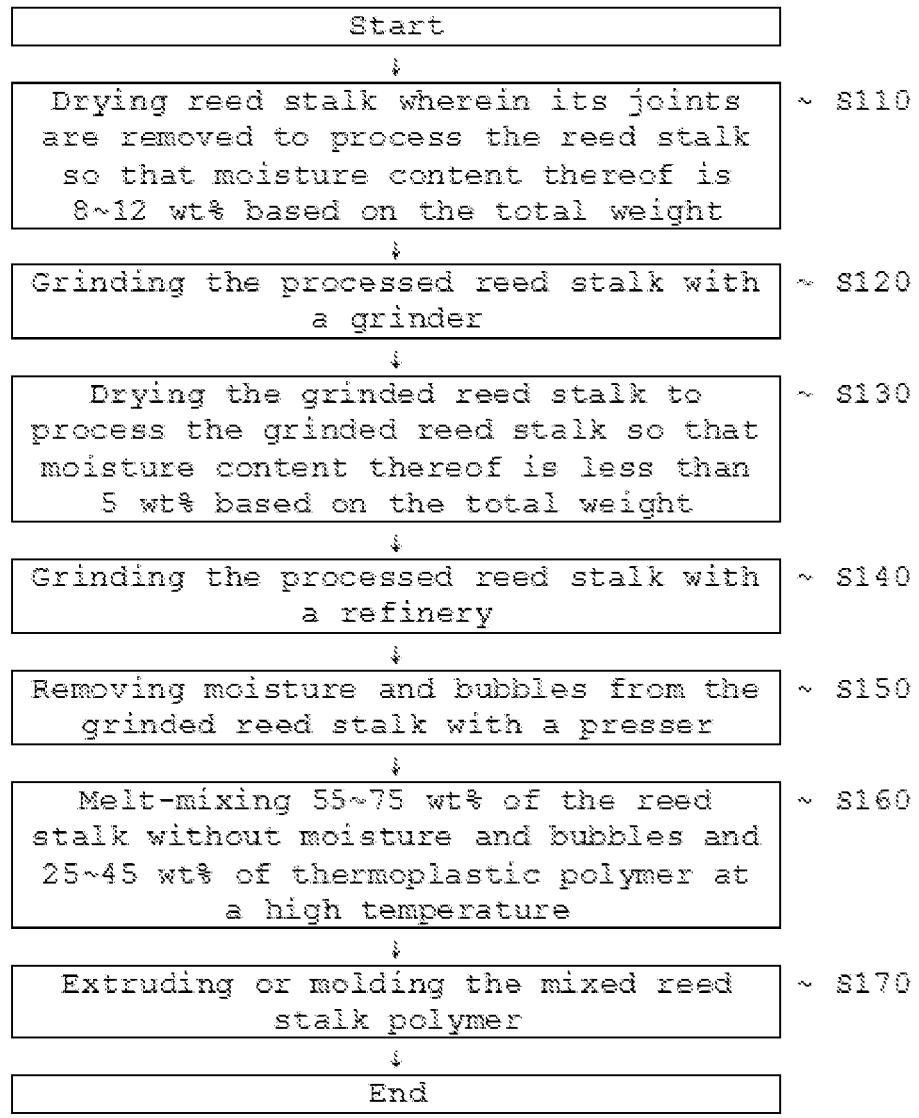

REED COMPOSITE, MANUFACTURING METHOD THEREOF AND BUILDING MATERIAL USING THE SAME

CROSS REFERENCE TO RELATED APPLICATION

This application is a National Stage of International Application No. PCT/KR2010/006844, filed on Oct. 7, 2010, which claims priority from KR 10-2009-0100037, filed on Oct. 21, 2009, the contents of all of which are incorporated herein by reference in their entirety.

TECHNICAL FIELD

The present invention relates to composite which can be used as building material. More particularly, the present invention relates to composite manufactured by melt-mixing reed stalk powder and thermoplastic polymer at high temperature, a method of manufacturing the composite, and interior and exterior building material using the composite.

BACKGROUND ART

Recently, the consumer preference for natural wood has been highly increased, and at the same time, concerns about environmental disruption according to increase in carbon dioxide due to lumbering of natural wood have been raised significantly. Therefore, demands for development of substitute for natural wood have been increased. Particularly, building materials field which has a great demand for a natural wood are those.

Under these circumstances, many studies on composite with similar texture and appearance to natural wood have been conducted recently.

Therefore, composite which contains wood in small amount or non-wood has been suggested. For example, such composite is divided into the plywood which is manufactured by slicing material lumber into thin pieces, coloring and drying one or both sides of each piece, attaching a film with adhesive, drying it, and cutting it into pieces with a fixed length; and MDF (Medium Density Fiber wood) which is manufactured by grinding material lumber or waste lumber, adding a large amount of resin and hot-pressing the mixture. MDF can be processed and used for each purpose by attaching natural or vinyl sliced veneers to MDF.

But, due to harmful materials included in its adhesives, these composite woods give harmful effect to human body and contaminate environment. Especially formaldehyde contained in adhesives can cause cancer. Further, MDF cause problems such as a swell and shrinkage between sliced veneer and boards, and separation, crack or decomposition of sliced veneer attached due to influence of outside moisture.

Korean laid-open Publication No. 2006-0057740 (May 29, 2006) discloses a method of obtaining plant fibers from by-products such as rice straw, wheat straw, barley straw, cornstalk, leaves of corn, and waste herbaceous plants such as reed. The method includes collecting and grinding by-products and waste herbaceous plants, centrifugally separating, and collecting plant fibers by adding water into centrifugally separated waste herbaceous plants. The plant fibers obtained by the conventional method can be used for containers, agricultural ports and subsidiary building materials. However, they might have lower durability and strength and can be easily bent or stretched since they are made only from plant fibers.

Therefore, studies on composite made from non-wood while having excellent bending and stretching resistance, higher strength and no change in color from sunlight are required.

DISCLOSURE

Technical Problem

It is an object of the present invention to provide composite with higher strength which can be safely used for a long period without any change in its color and shape such as fracture, crack, bending or stretching. It is another object of the present invention to provide a method for manufacturing the above composite. It is still another object of the present invention to provide building materials such as interior material, landscaping material and exterior finishing material using the above composite.

Technical Solution

According to an aspect of the present invention, there is provided reed composite comprising: 55 to 75 wt % of reed stalk having a particle size of 40 to 180 mesh wherein its joints are removed, and 25 to 45 wt % of thermoplastic polymer impregnated into fibers of the reed stalk.

According to another aspect of the present invention, there is provided a method of preparing reed composite, comprising:

drying reed stalk wherein its joints are removed to process the reed stalk so that its moisture content is 8 to 12 wt % based on the total weight;

grinding the processed reed stalk with a grinder;

drying the grinded reed stalk to process the grinded reed stalk so that its moisture content is less than 5 wt % based on the total weight;

treating the processed reed stalk with a refinery and grinding a powdering machine;

removing moisture and bubbles from the grinded reed stalk powder with a presser;

melt-mixing 55 to 75 wt % of grinded reed stalk without the moisture and bubbles are removed and 25 to 45 wt % of thermoplastic polymer at high-temperature; and extruding the mixed reed stalk polymer.

According to a further aspect of the present invention, there is provided a building material using the above reed composite, or a building material which is prepared by the above preparing method.

Advantageous Effects

The composite of the present invention uses reed stalk. Thus, the composite is eco-friendly. The composite of the present invention contains reed stalk and thermoplastic polymer. Therefore, the composite can have excellent bonding strength and high density, and excellent strength such as tensile strength, bending strength, impact strength, and flexibility, but no swelling. Further, the composite has no change in color even from its long exposure to sunlight. Further, reed stalk has its own high water resistance.

Due to its physical and mechanical properties above, the composite of the present invention can be neither broken nor cracked by strong external force. The composite of the present invention can neither bent nor stretched by liquid such as rainwater and beverage or by sunlight.

The composite of the present invention is light in weight and has similar texture and pattern to natural wood so that it is convenient for transporting and applying in the construction. Moreover, the composite can be used for a longer period than composite containing wood since it is less attacked from harmful insects.

And, the composite can be recycled by grinding and melting it, and it can be also used for building material including interior material, landscaping material and exterior material. Particularly, when the composite is used as interior building material, it has excellent durability and water-proof property. When the composite is used as exterior building material, it has excellent water-resistant and higher strength. In addition, the composite does not exhibit toxicity. Therefore, the composite can be used in various applications.

BRIEF DESCRIPTION OF THE DRAWINGS

FIG. 1 is a block view illustrating a method of manufacturing a composite according to a preferred embodiment of the present invention.

DISCLOSURE OF THE INVENTION

The present invention concerns eco-friendly reed composite having high strength which includes reed stalk wherein its joints are removed, wherein its moisture content is high so that moisture cannot be easily removed and the joints becomes obstacle to maintain a uniform density, and thermoplastic polymer, and can be used as building material. And, The present invention concerns the manufacturing method of the reed composite. Herein, building material includes interior material which is installed inside of the building, landscaping material which is installed outside of the building, and exterior material.

Hereinafter, the present invention will be explained in more detail.

Reed composite of the present invention (hereinafter referred to as the "composite") comprises 55 to 75 wt % of reed stalk having a particle size of 40 to 180 mesh wherein its joints are removed and 25 to 45 wt % of thermoplastic polymer wherein the thermoplastic polymer is impregnated into fibers of the reed stalk. Additionally, the composite may further comprise additives according to its usage, besides the fibers and the thermoplastic polymer.

Reed used in the present invention is that which grows naturally in a river mouth. Reed stalk means parts of reed wherein leaves, roots and firm joints are removed. Herein, joint is a solid and thick part in the range of 2.0~2.5 mm from the part of connecting stalks, and its moisture content is so high that moisture cannot be easily removed by drying joint. This joint prevents fibers from obtaining uniform quality. Therefore, it is preferable to remove all joints.

The reed stalk is composed of 97 wt % or more of fibers and less than 3 wt % of core. That is, the reed stalk is mostly composed of fibers, which can be used without separation of cores.

The fiber length of the reed stalk used in the present invention is 1.8 to 2.0 mm, preferably, 2.0 mm. The fiber length gains an effect on physical and mechanical properties of composite.

This reed stalk has enough value as raw material which can be substituted for wood, fiber, and the like. Especially, the reed stalk can do an important role for improving the profitability of farms by utilizing agricultural resources for manufacturing composite which can be substituted for wood polymer composite, the reed stalk can also reduce air pollution by lessening carbon dioxide emissions.

The reed stalk used in the present invention should be grinded into fine powder or a little bit thicker mesh according to its usage. Herein, the reed stalk preferably has a particle size of 40 to 180 mesh. However, when the composite is used as landscaping material and exterior material, the reed stalk preferably has 40 to 100 mesh. When the composite is used as interior material, the reed stalk preferably has 100 to 180 mesh. The grinded reed stalk preferably has a ratio of length to diameter of 3:1 to 5:1.

Where the thermoplastic polymer is impregnated into the grinded reed stalk (reed powder), it is easy to use since its density and volume are suitable for transporting, storing and manufacturing products.

The grinded reed stalk (reed powder) and the thermoplastic polymer are melted at high temperature so that the thermoplastic polymer is impregnated into pores of fibers in the reed powder, and then, reed stalk polymer is produced. Therefore, if a particle size of the reed stalk is less than 40 mesh, fibers of the reed powder and the polymer cannot be combined because of large particle size of reed powder. Then, polymer or fiber particles may be pushed to one place. The polymer or fiber particles are not uniformly distributed so that the equality of density may be lowered. If a particle size of the reed stalk is more than 120 mesh, the thermoplastic polymer may not be impregnated into pores of fibers when mixing the fibers and the thermoplastic polymer.

Also, when reed stalk has a ratio of length to diameter of less than 3:1, the thermoplastic polymer may not be sufficiently impregnated into the fibers, and thus, durability of the composite may be lowered. When the reed stalk has a ratio of length to diameter of more than 5:1, the thermoplastic polymer may not be impregnated into pores of the fibers due to its longer length.

The grinded reed stalk is pressed with a presser in order to remove moisture and bubbles.

The grinded reed stalk (reed powder) is used in an amount of 55 to 75 wt %, preferably, 60 to 65 wt % based on the total weight. The thermoplastic polymer is used in an amount of 25 to 45 wt %, preferably, 35 to 40 wt % based on the total weight. If the amount of the reed stalk is less than 55 wt % based on the total weight, the usage of the thermoplastic polymer will be increased and the manufactured composite will be almost closed to plastic. Therefore the composite will have poor texture and will not be eco-friendly. If the amount of the reed stalk is over 75 wt % based on the total weight, the composite will have lower binding strength between fibers because of the decreased amount of thermoplastic polymer, and can be twisted when exposed to water for a long time.

The thermoplastic polymer is one or more selected from the group consisting of polypropylene (PP), polyethylene (PE), polystyrene (PS), and polyethylene terephthalate (PET). It may include waste plastic, but is not preferable to use plastic containing polyvinyl chloride which is harmful to human body.

In addition, additives can be added to reed stalk polymer which is made from the reed stalk and the thermoplastic polymer. An amount of additives is 8 to 15 parts by weight based on 100 parts by weight of the reed stalk polymer, but is not limited thereto. The amount of the additives can vary depending on products.

The additives are one or more selected from the group consisting of binder, antioxidant, UV stabilizer, UV absorbent, Lubricant, mineral filler, colorant, flame-retardant, heat stabilizer and forming agent. Building material can be manufactured by using composite of the present invention. In this case, the types of additives vary depending on the type of building material. The building material includes interior material such as flooring material, internal material, furniture material, noise barrier and doors and windows; landscaping material such as railing, fence, louver, and post; and exterior material which is installed on the outer wall of a building, but is not limited thereto. The building material can mean everything which can use the composite.

For example, when the composite of the present invention is used as flooring material, the composite can comprise binder of 2~4 parts by weight, UV stabilizer of 1~2 parts by weight, UV absorbent of 1~2 parts by weight, colorant of 2~4 parts by weight and forming agent of 1~2 parts by weight based on 100 parts by weight of reed stalk polymer. When the composite of the present invention is used as internal material, furniture material or noise barrier, the composite can comprise mineral filler of 0.5~2 parts by weight, flame-retardant of 2~4 parts by weight, binder of 2~4 parts by weight and antioxidant of 1~2 parts by weight based on 100 parts by weight of reed stalk polymer. Further, the composite of the present invention is used as windows and doors, the composite can comprise antioxidant of 1~2 parts by weight, heat stabilizer of 1~2 parts by weight, flame-retardant of 2~4 parts by weight, lubricant of 1~2 parts by weight and binder of 1-2 parts by weight based on 100 parts by weight of reed stalk polymer. Further, the composite of the present invention is used as railing, the composite can comprise UV stabilizer of 3 to 4 parts by weight, UV absorbent of 3 to 6 parts by weight and binder of 2 to 3 parts by weight and antioxidant of 1 to 2 parts by weight based on 100 parts by weight of reed stalk polymer. Especially, when the particle size of the reed powder is over 100 mesh, the binder is used 1.5~2 times more than that of the reed powder being less than 100 mesh. For example, if reed powder is 100 mesh or more during manufacturing composite, the binder of 2 to 4 parts by weight is used, but if reed powder is less than 100 mesh, the binder of 1 to 2 parts by weight is used. But the amount of the binder is not limited thereto. Other additives can further be added when manufacturing the building materials above.

In the additives, the binder is used for improving binding strength by allowing thermoplastic polymer to be easily impregnated. The antioxidant intercepts oxygen and ultraviolet rays, and prevents the discoloration. The UV stabilizer is used for preventing the discoloration from UV, the UV absorbent is used for absorbing UV, and the lubricant is used for increasing the dispersion of fibers which are fine powders. Further, the mineral filler is used for preventing any deformation from impact, heat and load, colorant is used for assigning color to products, the flame-retardant is used for providing products with heat resistance, the heat stabilizer is used for minimizing decomposition from heat during processing and using the composite, and the forming agent is used for taking a role of discharging fibers.

The composite of the present invention can be reused by grinding and melting it.

Moreover, the composite of the present invention does not have rough or poor surface even without separation of core from the reed stalk. Further, its strength and durability are not significantly lowered than the case having only fibers. Therefore, although the reed stalk, only fibers can be used by separating core from fibers; or without separation, it is preferable to use the reed stalk without separation of core in terms of process convenience and manufacturing cost of the composite.

FIG. 1 is a block view illustrating a method for manufacturing a composite according to a preferred embodiment of the present invention.

As shown in FIG. 1, the method for manufacturing the composite of the present invention includes drying reed stalk wherein its joints are removed to process the reed stalk so that its moisture content is 8 to 12 wt % based on the total weight of the reed stalk (S110), grinding the processed reed stalk with a grinder (S120), drying the grinded reed stalk to process the grinded reed stalk so that its moisture content is less than 5 wt % based on the total weight of the grinded reed stalk (S130), grinding the processed reed stalk with a refinery (S140), removing moisture and bubbles from the grinded reed stalk (reed powder) (S150), melt-mixing 60 to 65 wt % of the reed powder in which moisture and bubbles are removed, and 35 to 40 wt % of thermoplastic polymer at a high temperature (S160) and extruding the mixed reed stalk polymer (S170). Herein, the method further comprises crushing reed stalk between S110 and S120, and further comprises adding additives between S160 and S170.

In the processing of the reed stalk (S110), the reed stalk is a part of reed wherein leaves, roots and firm joints are removed. Generally, reed stalk does not give any significant effect when manufacturing composite due to its low core content, so that the reed stalk with core can be used.

Generally, reed stalk which grows naturally in a river mouth contains moisture of 15~20 wt % based on the total weight. However, the reed stalk which contains moisture content of 8~12 wt % based on the total weight is desirable for grinding reed stalk, so it should be dried naturally. In this case, when the moisture content of the reed stalk is less than 8 wt % based on the total weight, the amount of reed stalk broken into powder during grinding will be increased and the yield might be decreased. When the moisture content of the reed stalk is over 12 wt % based on the total weight, grinding may not be processed smoothly.

In the grinding the processed reed stalk with a grinder (S120), the reed stalk obtained in S110 is grinded into pieces to have a length of 0.8 to 1.3 cm with a grinder. The grinded reed stalks having this length can be dried fast and easy to be made into fine powders.

Herein, if reed stalk is too long, it might not be grinded into pieces to have a length of 0.8 to 1.3 cm. So, the method according to the present invention may further comprise crushing the reed stalk into pieces to have a length of 2 to 3 cm with a crusher in advance.

In the drying the grinded reed stalk and processing the grinded reed stalk (S130), the reed stalk obtained in S120 is dried to have moisture content of less than 5 wt % based on the total weight. If the moisture content of the grinded reed stalk is 5 wt % or more based on the total weight, bubbles can be generated inside of the composite, thereby lowering the product quality. Herein, if the grinded reed stalk having the moisture content less than 5 wt % based on the total weight, its moisture content is reduced to less than 3 wt % based on the total weight while passing through a presser in S150 stage below. Not all cores are separated from fibers, but at least some cores can be removed by the drying of the reed stalk as above.

In grinding processed reed stalk with a refinery (S140), the reed stalk obtained in S130 is treated with a refinery to form some fibers, and then is grinded with a refinery to have a particle size of 40~80 mesh while having the ratio of length to diameter of 3:1 to 5:1. A refinery generally used in the art can be exploited. The refinery is generally operated in the forward direction when grinding wood. However, in the present invention, it is preferable to operate the refinery in the reverse direction so that fibers can be better swollen.

The disk of the refinery is operated in opposite direction, that is, in the reverse direction, so that fibers of the reed stalk are more twisted. Thus, fibers can be more swollen or loosened, thereby improving a binding strength between fibers.

Therefore, manufacturing the composite with more swollen fibers increases the binding strength between fibers, and thus, tensile strength of the composite becomes higher.

In removing moisture and bubbles from the grinded reed stalk (reed powder) with a presser (S150), the reed powder obtained in S140 is compressed with a presser in order to minimize moisture and bubbles which can be generated in composite so that the distribution of uniform density can be assured. Herein, the process can be carried out under a pressure of 1~2 kgf/cm² according to the amount of reed powder.

In the mixing of thermoplastic polymer and the reed powder wherein moisture and bubbles are removed (S160), reed stalk polymer is manufactured by melt-mixing 55 to 75 wt % of the reed stalk obtained in S150 and 25 to 45 wt % of thermoplastic polymer at a high temperature of 150~200° C. The thermoplastic polymer produced is impregnated into pores of swollen fibers in reed stalk polymer, and thus, binding strength between the fibers and the thermoplastic polymer is increased. Therefore, the reed stalk polymer with a high density can be manufactured.

In the extruding of reed stalk polymer (170), gel-type composite without bubbles is obtained by hot-processing and extruding the reed stalk polymer manufactured in S160 under the temperature of 130~140° C. and the pressure of 20-35 kgf/cm² for 15~20 minutes. The composite obtained is molded and used as building material for any necessary purpose. The method for forming composite includes extrusion, but is not limited thereto.

Any method can be used such as molding which can form composite. After, the above S190, the method according to the present invention further comprises the adding additives depending on the type of building material.

Specific gravity of composite using reed powder is 1~1.15 higher than that of other non-wood powders such as corn powder or bagasse powder. Generally, additives with higher specific gravity are added to non-wood powder for increasing specific gravity. But the reed powder has uniform density even without additives for increasing specific gravity. Therefore, the composite having excellent durability and water resistance can be provided.

Hereinafter, the present invention will be described in more detail with reference to examples, comparative examples and experimental examples. However, the following examples, comparative examples and experimental examples are used to illustrate the present invention, and the scope of the present invention is not limited thereto.

Example 1

Reed stalk wherein leaves, roots and joints are removed was processed to have moisture content of 9 wt % based on the total weight, and then the processed reed stalk was grinded into pieces to have a length 1 cm with a grinder. The grinded reed stalk is processed to have moisture content of 4 wt % based on the total weight, and then the processed reed stalk was grinded with a refinery. At this time, the reed stalk is grinded in reverse direction, not forward direction to promote swelling of fibers, and a particle size of the grinded reed stalk was 90 mesh and the ratio of length to diameter was 4:1. The grinded reed stalk was compressed with a presser in pressure of 2 kgf/cm² for 5 minutes in order to remove moisture and bubbles.

The obtained-above reed stalk (reed powder) 70 g and polypropylene 30 g were melt-mixed at 170° C., and the mixture were extruded under 160° C. and the pressure of 28 kgf/cm² for 20 minutes, and then, composite was manufactured.

Example 2

Composite was manufactured in the same manner as described in Example 1, except that reed stalk 60 g and polyethylene 40 g were mixed.

Example 3

Composite was manufactured in the same manner as described in Example 1, except that water was added into reed stalk having moisture content of 4 wt % based on the total weight in the ratio of 1:1, and then, the mixture were pounded in the pressure of 2 kgf/cm² for 5 minutes, thereby producing soft reed stalk. Herein, wooden mortar was used instead of metallic equipment.

Example 4

Composite was manufactured in the same manner as described in Example 1, except that mineral filler 2 g, flame-retardant 3 g and binder 3 g were added before the extruding.

Example 5

Composite was manufactured in the same manner as described in Example 1, except that UV stabilizer 3 g, UV absorbent 5 g and binder 3 g were added before the extruding.

Comparative Example 1

Composite was manufactured in the same manner as described in Example 1, except that fibers having a particle size of 200 mesh were used.

Comparative Example 2

Composite was manufactured in the same manner as described in Example 1, except that fibers having the ratio of length to diameter of 6:1 were used.

Comparative Example 3

Composite was manufactured in the same manner as described in Example 1, except that reed stalk 40 g and polyethylene 60 g were mixed.

Comparison Example 4

Composite was manufactured in the same manner as described in Example 1, except that reed stalk with joints was used.

Comparison Example 5

Composite was manufactured in the same manner as described in Example 1, except that fibers from corn were used instead of that from reed stalk.

Experimental Example

Tensile strength (MPa): Measuring tensile strength according to KS M 3006 (Plastic extensibility test method) (reference value: over 12 MPa).

Bending strength (MPa): Measuring bending strength according to KS M ISO 178 (Plastic bending test method) (reference value: over 61~82 MPa).

Bending elastic modulus (MPa): Measuring bending elastic modulus according to KS M ISO 178 (Plastic bending test method) (reference value: over 2100 MPa).

Water absorption ratio (%): Measuring absorptance of moisture according to KS M 3015 (General plastic test method) (reference value: less than 3%).

Impact strength (kg·cm/cm$^2$): Measuring impact strength according to KS M 3055 (plastic-Izod impact strength test method) (reference value: over 12 kg·cm/cm$^2$).

Dimensional change in moisture (%): Measuring dimensional change in moisture according to KS F 3126 (Test method dimensional change in moisture to decorated woody floor-coverings) (reference value: 0.3% or less in the length direction, 2% or less in the width direction).

Table 1 below shows the comparison between Examples 1 to 5, and Comparative Examples 1 to 4.

TABLE 1

|  |  | Exp. 1 | Exp. 2 | Exp. 3 | Exp. 4 | Exp. 5 | Comp. Exp. 1 | Comp. Exp. 2 | Comp. Exp. 3 | Comp. Exp. 4 | Comp. Exp. 5 |
|---|---|---|---|---|---|---|---|---|---|---|---|
| Tensile strength (MPa) | | 16.0 | 16.3 | 16.2 | 16.1 | 15.9 | 8.3 | 7.9 | 4.1 | 4.5 | 4.2 |
| Bending strength (MPa) | | 82.0 | 83.1 | 81.8 | 80.9 | 81.2 | 54.2 | 51.2 | 45.9 | 45.3 | 44.3 |
| Bending elastic modulus (MPa) | | 3204 | 3241 | 3201 | 3209 | 3216 | 1912 | 1924 | 1855 | 1811 | 1841 |
| Water absorption ratio (%) | | 1.3 | 1.1 | 1.4 | 1.2 | 1.3 | 1.9 | 2.0 | 2.1 | 4.5 | 4.2 |
| Impact strength (kg·cm/cm$^2$) | | 13.5 | 13.6 | 13.4 | 13.8 | 13.2 | 9.1 | 9.0 | 8.2 | 7.4 | 8.5 |
| Dimensional change in moisture (%) | Length direction | 0.01 | 0.01 | 0.01 | 0.01 | 0.01 | 0.5 | 0.4 | 0.9 | 0.8 | 0.8 |
| | Width direction | 0.12 | 0.1 | 0.13 | 0.1 | 0.1 | 1.6 | 2.7 | 3.1 | 3.2 | 3.0 |

As shown in Table 1, Examples 1 to 5 exhibited excellent strength such as tensile strength, bending strength and impact strength, and elasticity. They showed almost no dimensional change. Therefore, swelling was not observed.

On the other hand, Comparative Examples 1 to 4, which is not followed by the particle size of reed stalk, the ratio of length to diameter, the amount of thermoplastic polymer and removal of joints according to the example of the present invention, showed the decrease of the strength and elasticity of composite, and poor dimensional change which means that composite can be bended or stretched. Further, the composite of Comparative Examples 1 to 4 exhibited a higher water absorption ratio, compared to the composite of Examples 1 to 5, which should decrease of water resistance. Specially, Comparative Example 5 which uses corn showed a higher water absorption ratio.

Change in color of the composites obtained in Examples 1 to 5 and Comparative Examples 1 to 5 was observed with naked eye by exposing them in UV for 30 days. The color of Comparative Example 5 which is the composite using corn was gradually changed to more golden yellow, compared to the composite using the reed stalk.

The invention claimed is:

1. A reed composite comprising:
55 to 75 wt % of a reed stalk having a particle size of 40 to 180 mesh while having a ratio of length to diameter of 3:1 to 5:1, wherein the reed stalk does not include joints, leaves and roots of the whole body of the reed; and
25 to 45 wt % of a thermoplastic polymer impregnated into fibers of the reed stalk, based on the total weight of the reed composite.

2. The reed composite according to claim 1, which comprises 60 to 65 wt % of the reed stalk, and 35 to 40 wt % of the thermoplastic polymer, based on the total weight of the reed composite.

3. The reed composite according to claim 1, wherein the reed stalk has a particle size of 40 to 100 mesh.

4. The reed composite according to claim 1, wherein the reed stalk has a particle size of 100 to 180 mesh.

5. The reed composite according to claim 1, wherein the thermoplastic polymer comprises at least one selected from the group consisting of polypropylene, polyethylene, polystyrene and polyethylene terephthalate.

6. The reed composite according to claim 1, which further comprises 8 to 15 parts by weight of additives based on 100 parts by weight of the mixture of the reed stalk and the thermoplastic polymer.

7. The reed composite according to claim 6, wherein the additives comprises at least one selected from the group consisting of binder, antioxidant, UV stabilizer, UV absorbent, lubricant, mineral filler, colorant, flame-retardant, heat stabilizer and forming agent.

8. A building material comprising the reed composite as defined in claim 1.

9. A method of manufacturing a reed composite, comprising:
melt-mixing 55 to 75 wt % of grinded reed stalk wherein the reed stalk does not include joints, leaves and roots of the whole body of the reed and 25 to 45 wt % of thermoplastic polymer at high-temperature; and
extruding the melt-mixture of the grinded reed stalk and the thermoplastic polymer,
wherein the grinded reed stalk has a particle size of 40 to 180 mesh while having a ratio of length to diameter of 3:1 to 5:1 and the thermoplastic polymer is impregnated into fibers of the reed stalk.

10. The method of manufacturing reed composite according to claim 9, wherein the grinded reed stalk is prepared by steps of:
drying reed stalk wherein its joints, leaves and roots are removed so that its moisture content is 8 to 12 wt % based on the total weight of the reed stalk to obtain a first dried reed stalk;
grinding the first dried reed stalk with a grinder to obtain a first grinded reed stalk;

drying the first grinded reed stalk so that its moisture content is less than 5 wt % based on the total weight of the first grinded reed stalk to obtain a second dried reed stalk;

treating the second dried reed stalk with a refinery and grinding the treated second dried reed stalk with a powdering machine to obtain a second grinded reed stalk; and removing moisture and bubbles from the second grinded reed stalk powder with a presser.

11. The method of manufacturing reed composite according to claim 10, which further comprises crushing reed stalk before grinding the first dried reed stalk with the grinder.

12. The method of manufacturing reed composite according to claim 10, wherein in grinding the treated second dried reed stalk with the refinery, the refinery is performed in a reverse direction.

13. The method of manufacturing reed composite according to claim 9, wherein the melt-mixing the grinded reed stalk and the thermoplastic polymer is performed at a temperature of 150 to 200° C.

14. The method of manufacturing reed composite according to claim 9, wherein the extruding the reed stalk polymer is carried out under pressure of 20 to 35 kgf/cm$^2$ and a temperature of 160 to 180° C.

15. A building material which is manufactured by the method of claim 9.

\* \* \* \* \*